May 16, 1950            R. P. UPTON            2,507,841
METHOD AND MEANS FOR CUTTING GLASS
Filed Feb. 13, 1948            3 Sheets-Sheet 3
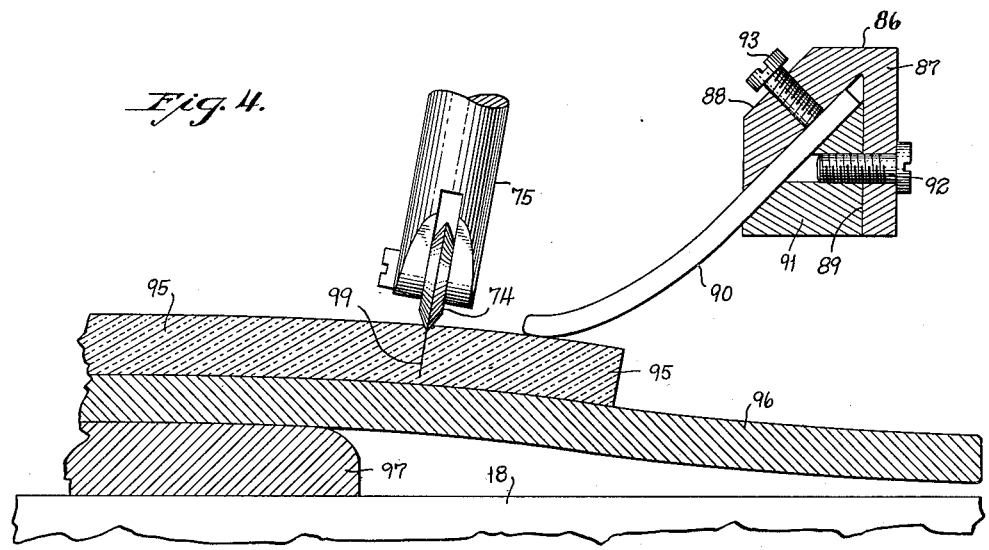
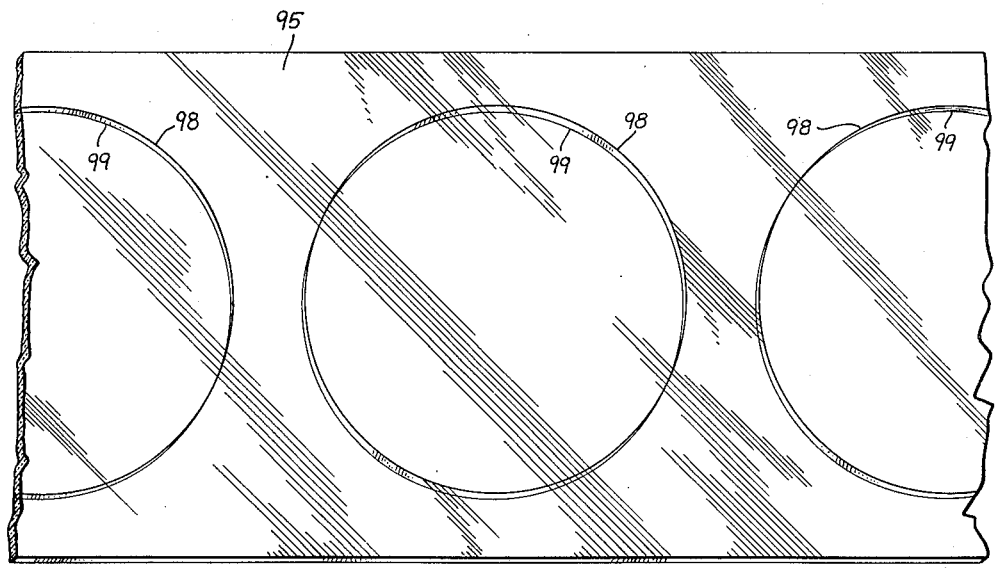
Inventor
Ross P. Upton
By Seymour, Earle & Nichols
Attorneys Patented May 16, 1950

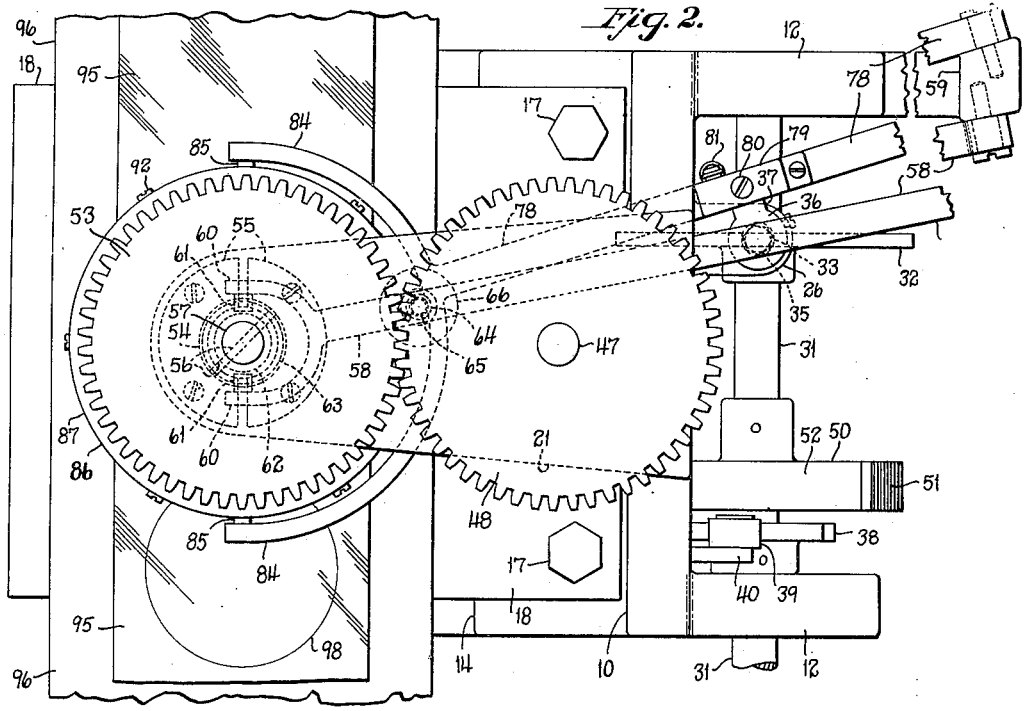

2,507,841

UNITED STATES PATENT OFFICE 2,507,841

METHOD AND MEANS FOR CUTTING GLASS

Ross P. Upton, Watertown, Conn.

Application February 13, 1948, Serial No. 8,123

14 Claims. (Cl. 49—48)

The present invention relates in general to glass cutting and more especially to the opening of a closed cut scribed on a sheet of glass.

An object of the invention is to provide improved method and means for cutting disks, ovals and similar closed blanks from a sheet of glass.

A further object of the invention is to cut closed blanks from sheet glass with a minimum of operations, labor and materials and with a high degree of uniformity.

A still further object of the invention is to provide an improved method and means for automatically opening a closed cut in a sheet of glass.

A still further object of the invention is to open a closed cut in sheet glass by stressing the glass prior to forming the closed cut therein and then making the closed cut while the glass is stressed so as to automatically open the cut as it is being made.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 2 is a broken plan elevation of the glass-cutting machine of Fig. 1 showing a strip of glass having one opened cut therein;

Fig. 3 is a broken plan elevation on section line 3—3 of Fig. 1;

Figure 1:
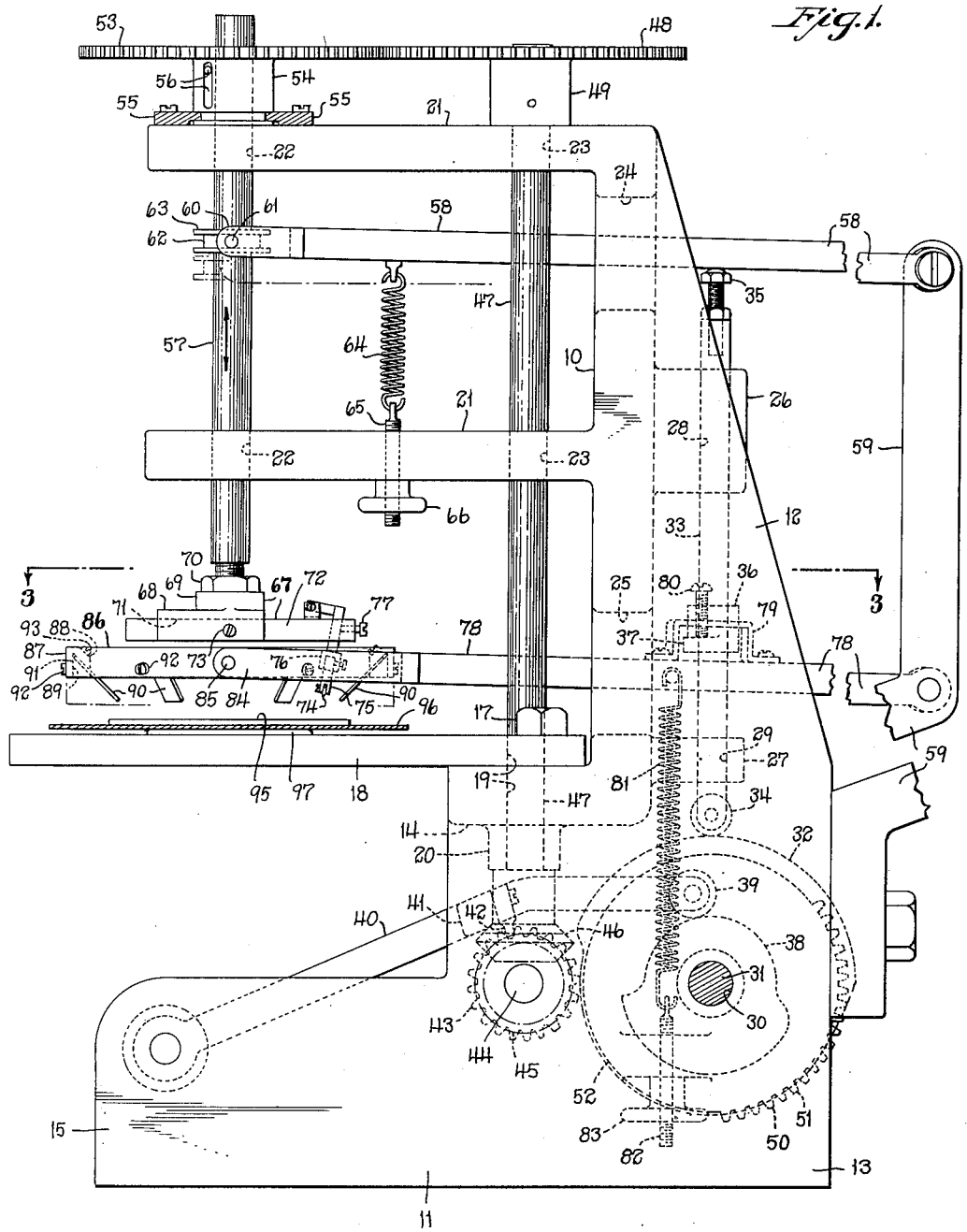
Fig. 1 is a broken side elevation of a glass-cutting machine embodying the improved cut-opening elements of the present invention and showing a strip of glass supported on the conveyor-belt of the machine.

Fig. 4 is an enlarged fragmentary end elevation partly in section on line 4—4 of Fig. 3, showing the cutting-tool and a presser-foot engaged on the convex surface of the concavo-convex glass, and the cut in the glass opened so as to extend nearly to the underside of the glass; and Fig. 5 is a broken perspective view of a strip of glass following the scribing of successive closed cuts and the breaking through thereof to the back side of the glass.

In carrying out the present invention, a glass-cutting machine is used which is of the type adapted to cut disks, ovals, ellipses, and similar types of closed figures, hereinafter referred to as "closed blanks," from a sheet of glass which is fed intermittently to the cutting-tool of the machine, the glass-feeding-and-supporting means comprising an endless belt having a substantially-horizontal run across the table of the machine. Referring particularly to Figs. 1, 2 and 3 of the drawings, the glass-cutting machine comprises, in the main, a frame consisting of a face plate 10 adapted to be supported in a substantially-vertical position by a pair of feet 11 formed integrally at the base of the face plate and extending forwardly and rearwardly thereof in substantially spaced-parallel relationship. The face plate is rigidly braced with respect to the feet of the frame by means of webs 12, each of which is joined integrally with the back side of the face plate and with the corresponding rearwardly-extending portion 13 of one of the feet of the frame. A bolster 14, substantially rectangular in cross section, is formed integrally at the intersection of the base of the face plate and the forwardly-projecting portions 15 of the feet of the frame, the bolster having vertical internally-screw-threaded apertures at opposite ends thereof respectively to receive fastening-bolts 17 adapted to secure one edge of a substantially-rectangular table 18 thereto, the latter being of a cantilever construction wherein its outer edge is unsupported.

A vertical aperture 19 is formed at the inner edge of the table intermediate the fastening-bolts 17 thereof, the vertical aperture 19 extending down through the bolster 14 and a bearing-boss 20 on the underside thereof and constituting a bearing-aperture adapted to support the lower end of a driving-spindle, hereinafter described.

Formed integrally on the front face of the plate 10 substantially symmetrically with respect to the longitudinal axis thereof and extending therefrom in cantilever style substantially horizontally and in vertically-spaced relationship is a pair of bearing-plates 21. The outer free end of each bearing-plate is rounded and each plate has a pair of vertical apertures formed therein which are spaced apart transversely on the longitudinal axis thereof. The outer aperture 22 of each bearing-plate is adjacent the outer end thereof and its inner aperture 23 is in axial alignment with the vertical bearing-aperture 19 of the bolster, both the inner and outer apertures 22 and 23 respectively of one bearing-plate being in alignment with the corresponding apertures of the second bearing-plate. The face-plate 10 of the frame is provided adjacent its left-hand side with a pair of clearance-apertures which extend therethrough to the rear face thereof, the one aperture 24 being formed intermediate the upper and lower bearing-plates 21 and the second aperture 25 being formed intermediate the lower bearing-plate and the bolster 14. Formed integrally on the back of the face plate, immediately beneath each clearance-aperture thereof, are bearing-blocks 26 and 27 respectively which extend rearwardly substantially perpendicularly to the face plate, the upper bearing-block being provided with a vertical bearing-aperture 28 in axial alignment with the vertical bearing-aperture 29 of the lower bearing-block, for supporting a vertically-reciprocable lift-rod, hereinafter described. Each rearwardly-extending portion 13 of a foot 11 of the frame is provided with a transverse aperture 30 constituting a bearing for the correspondingly-extending end of a transversely-extending main drive-shaft 31 which is driven from a power source (not shown) and is provided adjacent its left-hand end, between the two rearwardly-extending portions 13 of the frame, with a first lift-cam 32, the latter being keyed to the shaft in any suitable manner. The lift-cam is adapted to operate a lift-rod 33, the lower end of which is provided with a roller 34 adapted to ride on the lift-cam 32, the lift-rod being supported and guided for substantially-vertical reciprocable movement in the bearing-apertures 28 and 29 respectively of the aforesaid bearing-blocks 26 and 27 of the frame. At its upper end, the lift-rod is provided with an adjustable anvil 35 adapted to engage the underside of a lever-arm, hereinafter described, for lowering and elevating the glass-cutting tool into and from engagement with a sheet of glass, in the manner described below. Fixedly secured to the lift-rod 33, intermediate the two bearing-blocks 26 and 27, is a collar 36 which is adapted to be adjusted vertically on the lift-rod and has a laterally-projecting finger 37 for transferring the vertical reciprocable movement of the lift-rod 33 to a second lever-arm utilized to actuate the pressure-applying fingers of the pressing-member, in the manner and for the purposes hereinafter described.

Referring again to the main drive-shaft 31, the latter is provided at its right-hand end with a second lift-cam 38, the latter being suitably keyed to the drive-shaft immediately adjacent the inside face of the rearwardly-extending foot-portion 13 of the frame. The second lift-cam 38 is adapted to engage and actuate the cam-roller 39 of a locking-lever 40 which is pivoted at its forward end to the inside face of the forward extremity 15 of the right-hand foot of the frame. The locking-lever 40 is provided with a laterally-extending lug 41 on the outer end of which is mounted an adjustable downwardly-depending tooth 42. The latter is adapted, as hereinafter described, to engage the teeth of a spur-gear 43 which is keyed to the right-hand end of a spur-shaft 44. The latter extends transversely of the frame and is rotatably supported at its opposite ends in suitable bearing-apertures of the respective feet 11 thereof. Secured to the spur-shaft 44 and spaced to the left of the spur-gear 43 is a beveled pinion 45 which is adapted to mesh with a beveled pinion 46 keyed to the lower end of a drive-spindle 47, the latter being supported vertically for rotation in the aforementioned axially-aligned bearing-apertures 23 of the bearing-plates 21 and the bearing-aperture 19 of the bolster. The upper end of the drive-spindle 47 projects above the upper bearing-plate 21 and is provided with an intermediate drive-gear 48 having a hub 49 secured to the upper end of the spindle. The drive-gear 48 is adapted to be rotated by the drive-spindle 47 which is rotated, in turn, by its beveled-pinion connections 45 and 46 to the spur-shaft 44, the spur-gear 43 of which is adapted to be driven by a main drive-gear 50, keyed to the main drive-shaft 31 intermediate the lift-cams 32 and 38. The main drive-gear 50 has a toothed sector 51 and a plain sector 52 circumscribing its periphery, as a consequence of which continuous rotation of the main drive-gear 50 transmits intermittent rotation to the spur-gear 43. During the interval in which the spur-gear is being driven by the toothed sector 51 of the main drive-gear, the second lift-cam 38 actuates the cam-roller 39 of the locking-lever 40 to elevate and hold the tooth 42 thereof out of engagement with the teeth of the spur-gear 43, so as to permit uninhibited rotation thereof. However, as soon as the plain sector 52 of the main drive-gear arrives opposite the teeth of the spur-gear 43, the latter are disengaged and the second lift-cam 38 lowers the cam-roller 39 of the locking-lever 40, thereby permitting its tooth 42 to engage between a pair of teeth of the spur-gear 43 to instantaneously lock the latter. In accordance with accepted practice in the glass-cutting art, the arcuate measure of the toothed sector 51 and the orientation thereof with respect to the second lift-cam 38 is such that the spur-gear 43 and, hence, the intermediate drive-gear 48 will be rotated intermittently through exactly 360°, the purpose of which is hereinafter described.

The intermediate drive-gear 48 is adapted to mesh with a driven gear 53, the hub 54 of which is rotatably secured by a flanged plate 55 to the top of the upper bearing-plate 21 and connected by a spline 56 to the upper end of a tool-supporting spindle 57. The latter is supported adjacent its upper and lower ends for substantially-vertical movement in the axially-aligned apertures 22 of the bearing-plates 21 and is held up in the aforesaid apertures and reciprocated vertically therein by means of a lever-arm 58. To this end, the latter is pivoted at its rear end to the upper end of a substantially-vertical post 59 formed integrally or otherwise secured at the rear extremity of the left-hand foot of the frame, the forward end of the lever-arm 58 being forked so as to form transversely-spaced bowed arms 60 provided with oppositely disposed axially-aligned inwardly-extending lugs 61 adapted to engage in an annular groove 62 of a spool 63 secured to the tool-supporting spindle 57 intermediate the upper and lower bearing-plates. The bottom edge of the lever-arm, adjacent its rear end, rests on top of the aforementioned anvil 35 of the lift-rod 33, as a consequence of which as the latter is elevated and lowered by its lift-cam 32, similar motion is transmitted to the lever-arm 58 to, in turn, impart substantially-vertical reciprocable movement to the tool-supporting spindle 57. A lever-arm pull-down spring 64 is connected at its upper end to the underside of the lever-arm and at its lower end to the upper end of a screw-threaded stud 65 which extends freely through a vertical guide-aperture in the lower bearing-plate and is provided at its lower end with a thumb-nut 66 for adjusting the tension of the spring 64.

Mounted on the lower end of the tool-supporting spindle 57 is the tool assembly which is indicated generally at 67 and comprises a supporting-block 68 having a boss 69 on its top side provided with a vertical internally-screw-threaded aperture to accommodate the lower externally-screw-threaded end of the tool-supporting spindle, a suitable nut 70 being utilized to secure the block to the spindle with a tight connection. The block 68 is provided with a longitudinal dovetail groove 71 extending at substantially right angles to the spindle and adapted to support a tool-mounting bar 72 which is also of dovetail form in cross section so as to make a smooth sliding fit in the longitudinal groove of the block. The bar 72 is adapted to be held in a predetermined adjusted position in the supporting-block by means of a locking-screw 73. The cutting-tool, which in the present embodiment comprises a steel glass-cutting wheel 74, is rotatably mounted on a transverse axis at the lower end of a pin 75, the shank of which is detachably secured in any suitable manner in a socket at the lower end of a holder 76 which extends upwardly through an oblique aperture in the outer end of the bar 72 and is fixedly secured in adjusted position therein by means of a locking-screw 77. The locking-screw 73 of the tool-supporting bar permits radial adjustment of the tool for cutting work-pieces of different radii, while the locking-screw 77 permits vertical adjustments of the tool with respect to the work-piece for variations in thickness thereof.

A second lever-arm 78 is pivotally secured at its rear end to the aforesaid post 59 of the frame adjacent the lower end thereof and is provided on its upper edge with an inverted-U-shaped bracket 79 which is arranged symmetrically with respect to the longitudinal axis of the lift-rod 34, the bracket 79 being provided with an adjusting-screw 80 threadedly secured vertically in the transverse member of the U-shaped bracket, the lower end of the adjusting-screw 80 being adapted to engage the upper surface of the laterally-projecting finger 37 of the collar 36 secured to the lift-rod. In accordance with this construction, the lever-arm 78 and more particularly the forward outer free end thereof, is supported and reciprocated vertically by the action of the lift-rod, that is to say, as the latter moves upwardly, the laterally-projecting finger 37 of its collar 36 lifts the adjusting-screw 80 of the bracket 79, thereby pivoting the lever-arm 78 upwardly, whereas when the lift-rod moves downwardly, the laterally-projecting finger 37 tends to move away from the adjusting-screw 80 thereby lowering the lever-arm, the latter being urged to follow the lift-rod downwardly by means of a lever-arm pull-down spring 81 secured at its upper end to the lever-arm 79 and its lower end to a stud 82 supported in the lower part of the frame and provided with an adjustable thumb-nut 83. The outer end of the lever-arm 78 comprises two arcuate arms 84 which form a semicircle, each arm having at its outer end an inwardly-projecting trunnion 85, the trunnion 85 of one arm being in axial alignment with the trunnion 85 of the other arm and coincident with the major diameter of the semicircle.

Mounted between the two axially-aligned trunnions of the lever-arm 78 is a pressing-member indicated generally at 86, which comprises a circular continuous ring 87 substantially rectangular in cross section, the upper inner edge of the ring being beveled as at 88. Spaced around the ring at substantially equal distances and on the underside thereof, is a plurality of substantially prismatic-shaped recesses 89, each of which intersects the inner face and underside respectively of the ring and is adapted to accommodate a resilient presser-foot 90. The presser-foot comprises relatively-short lengths of sheet metal or equivalent relatively-stiff resilient material and are adapted to be fastened securely at their upper ends in the upper reaches of the respective prismatic recesses of the ring. To this end, each recess is provided with a prismatic key-block 91 which is adapted to be inserted into its respective recess against the underside of the resilient presser-foot therein and to be held securely in its recess by a screw 92 or equivalent fastening-means. Similar fastening-means 93 are mounted in internally-threaded apertures around the beveled edge 88 of the ring and are adapted to engage the upper surfaces of the corresponding resilient presser-feet to hold them securely against the prismatic key-blocks of the ring. In a preferred arrangement, the lower ends of the presser-feet are normally disposed in a common substantially-horizontal plane slightly below the cutting-edge of the steel glass-cutting wheel 74, as a consequence of which as the upper and lower lever-arms 58 and 78 respectively are lowered simultaneously into operating position by downward displacement of the lift-rod 33, the presser-feet will engage the upper surface of the glass plate prior to engagement of the steel wheel 74. It will be appreciated, however, that by making a suitable adjustment of the screw 80, the lower ends of the resilient presser-feet may be moved into a plane tangential to the lower edge of the cutting-wheel or into a plane above the latter.

As mentioned above, the machine is of the type adapted to cut closed glass blanks from a strip of glass and to this end, the strip of glass, indicated generally at 95, is delivered to the machine on an endless belt 96. The latter is usually canvas or similar relatively-flexible material and is adapted to pass in a substantially-horizontal run between the upper surface of the table 18 and the underside of the pressing-member 86. The underside of the conveyor-belt is adapted to be supported in its horizontal run across the top of the table 18 and immediately beneath the cutting-wheel and pressing-member by a platen 97 fixed to the top of the table. The platen 97 comprises a relatively-thin steel pad having rounded corners, the configuration of the steel pad corresponding to the configuration of the glass blanks to be cut from the sheet of glass. That is to say, when cutting disk-shaped glass blanks, then the steel platen is a disk, the diameter of which is less than the diameter of the glass disk to be cut. If the glass blank to be cut is elliptical in shape, then the platen is also elliptical, its major and minor axes being less than the corresponding axes of the glass ellipse to be cut from the sheet of glass. In the present embodiment, a glass disk is used to illustrate the invention, the platen being, therefore, disk-shaped, as indicated in Fig. 3.

In the operation of the machine, a relatively-long length of glass is supported on the conveyor-belt and fed thereby to the machine, the conveyor-belt being driven from the main drive-shaft of the machine in any well known manner so that the glass is fed intermittently to the platen. As the strip of glass arrives above the platen of the machine, the conveyor-belt is stopped automatically, whereupon the above described scriber gear-train, lift-rod and lever-arms of the machine lower the cutting wheel 74 and the presser-feet 90 into engagement with the upper surface of the glass, the presser-feet engaging the glass slightly ahead of the cutting-wheel and both the presser-feet and cutting-wheel being resiliently held in contact with the glass by the uniform force of the resilient springs 64 and 81 respectively. Consequently, when the cutting-wheel is lowered into its final operating position preparatory to scoring a closed cut on the upper surface of the glass, the resilient presser-feet 90 circumscribing the cutter 74 bear down upon the glass, thereby bowing the glass into substantially concavo-convex form, as illustrated in Fig. 4, thus stressing the glass and more especially the annular portion thereof circumscribing the periphery of the platen. Now, while the lower ends of the presser-feet remain firmly in engagement with the glass, the drive-spindle 47 is automatically rotated so as to swing the glass-cutting wheel 74 on the outer end of the radial tool-supporting bar 72 through a complete circle of 360°. Thus, the cutting-wheel scribes a continuous circular cut 98 in the upper convex surface of the stressed glass and at the end of its circular cut is automatically withdrawn from the glass. Inasmuch as the glass is stressed during the scribing of the cut and since the cut is scribed on a circle intermediate the periphery of the platen and the locus of the pressure-applying feet 90 of the pressure-member 86, the cut is automatically opened as it is scribed in the convex surface of the glass, the extent of the opening or "cracking out" of the cut depending on the thickness of the glass and the stress imposed thereon. As shown in Fig. 4, the opening 99 of the scribed cut 98 has extended nearly to the underside or concave surface of the concavo-convex glass blank, but it will be understood that the opening may extend through to the underside of the blank.

Following the scribing of one closed blank and the simultaneous and automatic opening of the cut, the cutting-wheel and pressure-member are automatically elevated by the lift-rod and the strip of glass advanced by the conveyor-belt to present an unscribed portion of the glass above the platen. The scribing operation is then repeated to form a second opened cut in the sheet of glass. After the sheet of glass has been filled with opened cuts, each forming a closed blank, as shown in Fig. 5, the sheet of glass is removed from the conveyor-belt and the scrap stock is clipped from around the opened cuts to release the completed disks of glass.

Although a steel glass-cutting wheel is disclosed in the present embodiment, it will be understood that a diamond or other type of cutter may be used with equal success.

It will be apparent from the foregoing description that the machine is capable of automatically cutting and simultaneously opening closed glass blanks in a strip of glass being fed intermittently to the machine and that the production of the glass blanks is wholly automatic with the possible exception of clipping the scrap stock from around the opened cuts, the latter operation being performed manually.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a machine for cutting closed blanks from a sheet of glass, the combination including: a frame; means on said frame for supporting a sheet of glass; pressure-means constructed and arranged to stress said sheet of glass throughout a portion thereof having the contour of a closed blank; and a cutting-member arranged to engage the stressed portion of said glass and to scribe a closed cut therein while said glass is stressed, thereby simultaneously to open said cut.

2. In a machine for cutting closed blanks from a sheet of glass, the combination including: a frame; means on said frame for supporting a sheet of glass; pressure-means including a platen arranged to stress said sheet of glass throughout a portion thereof circumscribing the periphery of said platen and having the contour of a closed blank; and a cutting-member arranged to engage the stressed portion of said glass and to scribe a closed cut therein while said glass is stressed, thereby simultaneously to open said cut.

3. In a machine for cutting closed blanks from a sheet of glass, the combination including; a frame; means on said frame for supporting a sheet of glass; a platen carried by said frame and arranged to engage the underside of the said supporting-means, the contour of said platen corresponding to the contour of a closed blank; pressure-means constructed and arranged to engage the side of said sheet of glass opposite said platen, said pressure-means and said platen being arranged to move relative to each other to stress said sheet of glass throughout a portion thereof circumscribing the periphery of said platen; and a cutting-member arranged to engage the stressed portion of said glass and to scribe a closed cut therein while said glass is stressed, thereby simultaneously to open said cut.

4. In a machine for cutting closed blanks from a sheet of glass, the combination including: a frame; means on said frame for supporting a sheet of glass; pressure-means mounted above said supporting-means; operating-means to move said pressure-means into engagement with said sheet of glass on said supporting-means to stress said sheet of glass throughout a portion having the contour of a continuous blank; and a cutting-member mounted above said supporting-means and arranged to be actuated by said operating-means to engage the stressed portion of said glass and to scribe a closed cut therein while said glass is stressed, thereby simultaneously to open said cut.

5. In a machine for cutting closed blanks from a sheet of glass, the combination including: a frame; a backing-member for supporting said sheet of glass, said backing-member comprising an endless belt having a horizontal run and movable intermittently for advancing said sheet of glass to a cutting-member; a platen fixedly mounted in said frame and arranged to engage the underside of said backing-member, the contour of said platen corresponding to the contour of a closed blank; a pressing-member disposed over and normally out of contact with said backing-member; a cutting-member arranged to act on the sheet of glass on the upper surface of said backing-member; and operating-means for intermittently lowering said pressing-member relative to said fixed platen into engagement with said sheet of glass to stress said sheet of glass throughout a portion thereof circumscribing the periphery of said platen, said operating-means being arranged simultaneously to move said cutting-member into engagement with the stressed portion of said glass to scribe a closed cut thereon while said glass is stressed, thereby simultaneously to open said cut.

6. In a machine for cutting closed blanks from a sheet of glass, the combination including: a frame; a backing-member for supporting said sheet of glass, said backing-member comprising an endless belt having a horizontal run and movable intermittently for advancing said sheet of glass to a cutting-member; a platen fixedly mounted in said frame and arranged to engage the underside of said backing-member, the contour of said platen substantially corresponding to the contour of a closed blank; a pressing-member disposed over and normally out of contact with said backing-member; a cutting-member arranged to act on a sheet of glass on the upper surface of said backing-member; operating-means for intermittently lowering said pressing-member relative to said fixed platen into engagement with said sheet of glass to stress the said sheet of glass throughout a portion thereof circumscribing the periphery of said platen, said operating-means being arranged simultaneously to move said cutting-member into engagement with the stressed portion of said glass to scribe a closed cut thereon while said glass is stressed, thereby simultaneously to open said cut; and locking-means actuated by said operating-means to lock the said cutting-member against turning when the cutting-member is out of engagement with said glass.

7. In a machine for cutting closed blanks from a sheet of glass, the combination including: a frame; a backing-member for supporting said sheet of glass, said backing-member comprising an endless belt having a horizontal run and movable intermittently for advancing said sheet of glass to a cutting-member; a platen fixedly mounted in said frame and arranged to engage the underside of said backing-member, the contour of said platen substantially corresponding to the contour of a closed blank; a pressing-member disposed over and normally out of contact with said backing-member; a cutting-member arranged to act on a sheet of glass on the upper surface of said backing-member; and operating-means for intermittently lowering said pressing-member relative to said fixed platen into engagement with said sheet of glass outside the periphery of said platen to impart a concavo-convex form to said glass, the said operating-means being arranged simultaneously to move said cutting-member into engagement with the concavo-convex glass intermediate the said pressing-member and the periphery of said platen to scribe a closed cut in the convex side of said concavo-convex glass, thereby simultaneously to open said cut.

8. In a machine for cutting closed blanks from a sheet of glass, the combination including: a frame; a backing-member for supporting said sheet of glass, said backing-member comprising an endless belt having a horizontal run and movable intermittently for advancing said sheet of glass to a cutting-member; a platen fixedly mounted in said frame and arranged to engage the underside of said backing-member, the contour of said platen substantially corresponding to the contour of a closed blank; a pressing-member disposed over and normally out of contact with said backing-member; a cutting-member arranged to act on a sheet of glass on the upper surface of said backing-member; operating-means for intermittently lowering said pressing-member relative to said fixed platen into engagement with said sheet of glass outside the periphery of said platen to impart a concavo-convex form to said glass, the said operating-means being arranged simultaneously to move said cutting-member into engagement with the concavo-convex glass intermediate the said pressing-member and the periphery of said platen to scribe a closed cut in the convex side of said concavo-convex glass, thereby simultaneously to open said cut; and locking-means actuated by said operating-means to lock the said cutting-member against turning when said cutting-member is out of engagement with said concavo-convex glass.

9. In a machine for cutting closed blanks from a sheet of glass, the combination including: a frame; a backing-member for supporting said sheet of glass, said backing-member comprising an endless belt having a horizontal run and movable intermittently for advancing said sheet of glass to a cutting-member; a platen fixedly mounted in said frame and arranged to engage the underside of said backing-member, the contour of said platen substantially corresponding to the contour of a closed blank; a pressing-member disposed over and normally out of contact with said backing-member; a cutting-member arranged to act on a sheet of glass on the upper surface of said backing-member; operating-means for intermittently lowering said pressing-member relative to said fixed platen into engagement with said sheet of glass outside the periphery of said platen to impart a concavo-convex form to said glass, the said operating-means being arranged simultaneously to move said cutting-member into engagement with the concavo-convex glass intermediate the said pressing-member and the periphery of said platen to scribe a closed cut in the convex side of said concavo-convex glass, thereby simultaneously to open said cut, said operating-means including a resilient member to hold the cutting-member in engagement with said concavo-convex glass with uniform force.

10. In a machine for cutting closed blanks from a sheet of glass, the combination including: a frame; a backing-member for supporting said sheet of glass, said backing-member comprising an endless belt having a horizontal run and movable intermittently for advancing said sheet of glass to a cutting-member; a platen fixedly mounted in said frame and arranged to engage the underside of said backing-member, the contour of said platen substantially corresponding to the contour of a closed blank; a pressing-member disposed over and normally out of contact with said backing-member; a cutting-member arranged to act on a sheet of glass on the upper surface of said backing-member; operating-means for intermittently lowering said pressing-member relative to said fixed platen into engagement with said sheet of glass outside the periphery of said platen to impart a concavo-convex form to said glass, the said operating-means being arranged simultaneously to move said cutting-member into engagement with the concavo-convex glass intermediate the said pressing-member and the periphery of said platen to scribe a closed cut in the convex side of said concavo-convex glass, thereby simultaneously to open said cut; locking-means actuated by said operating-means to lock the said cutting-member when said cutting-member is out of engagement with said concavo-convex glass, said operating-means including a resilient member to hold said cutting-member in engagement with said concavo-convex glass with uniform force; and a second resilient member to hold said pressing-member in engagement with said concavo-convex glass with uniform force.

11. A method of cutting closed blanks from a sheet of glass comprising the steps of: applying pressure on said sheet of glass to hold said glass in bowed concavo-convex form and then scribing a closed cut on the convex surface of said bowed concavo-convex glass inside the locus of the applied pressure, thereby simultaneously opening said cut.

12. A method of cutting closed blanks from a sheet of glass comprising the steps of: applying pressure on said sheet of glass to hold said glass in bowed concavo-convex form and then scribing a closed cut on the convex surface of said bowed concavo-convex glass inside the locus of the applied pressure, thereby simultaneously opening said cut; and thereafter clipping the waste margin of said glass from said closed blank.

13. A method of cutting closed blanks from a sheet of glass comprising the steps of: applying pressure on the marginal areas of said sheet of glass to hold said glass in a bowed concavo-convex form and then scribing a closed cut on the bowed convex surface of said concavo-convex glass inside the locus of the applied pressure, thereby simultaneously opening said cut.

14. A method of cutting closed blanks from a sheet of glass comprising the steps of: applying pressure on the marginal areas of said sheet of glass to hold said glass in a bowed concavo-convex form and then scribing a closed cut on the convex surface of said concavo-convex glass inside the locus of the applied pressure, thereby simultaneously opening said cut; and thereafter clipping the waste margin of said glass from said blank.

ROSS P. UPTON.

REFERENCES CITED

The following references are of record in the file of this patent:

UNITED STATES PATENTS

| Number | Name | Date |
|---|---|---|
| 2,122,258 | Louviaux | June 28, 1938 |